(12) United States Patent
Leimer

(10) Patent No.: US 6,415,487 B1
(45) Date of Patent: Jul. 9, 2002

(54) SERVICE TOOL FOR REMOVAL OF VALVE SEAL ASSEMBLY

(75) Inventor: Mark Alan Leimer, Fort Wayne, IN (US)

(73) Assignee: Dana Corporation, Toledo, OH (US)

(*) Notice: Subject to any disclaimer, the term of this patent is extended or adjusted under 35 U.S.C. 154(b) by 0 days.

(21) Appl. No.: 09/871,050

(22) Filed: May 31, 2001

(51) Int. Cl.[7] .................................................. B23P 19/04
(52) U.S. Cl. ........................ 29/213.1; 29/219; 29/270; 29/278
(58) Field of Search ................................ 29/213.1, 211, 29/219, 241, 257, 270, 278, 255, 238, 263

(56) References Cited

U.S. PATENT DOCUMENTS

| | | | |
|---|---|---|---|
| 1,517,525 A | * 12/1924 | Ault | ........................ 29/213.1 |
| 1,704,600 A | 3/1929 | Green | |
| 1,892,900 A | * 1/1933 | Marshall et al. | ........... 29/213.1 |
| 2,113,755 A | 4/1938 | Billington | |
| 2,484,043 A | 10/1949 | Malen | |
| 4,274,189 A | 6/1981 | Conover | |
| 4,304,035 A | * 12/1981 | Ecker | ........................... 29/249 |

* cited by examiner

Primary Examiner—Joseph J. Hail, III
Assistant Examiner—Lee Wilson
(74) Attorney, Agent, or Firm—Rader, Fishman & Grauer PLLC

(57) ABSTRACT

A service tool for dislodging circumferentially spaced, longitudinally extending fingers of a flangeless retainer of a valve stem seal from a valve guide of an internal combustion engine, the guide of the type having circumferential detents for retaining radially inwardly turned ends of the fingers. The tool includes an exterior shell formed of two symmetrical halves divided along a longitudinal axis. The shell is coupled to a cylindrical puller element that is encased within and axially movable in the shell; the puller element also comprises symmetrical halves longitudinally divided along same axis. The puller element halves are hinged, and each of the puller halves contain gear teeth for reacting with separate worm gears contained in shell halves and attached to levers. Manual movement of the levers causes cams in radially inwardly turned arms at opposite end of the puller to dislodge the fingers of the seal retainer.

10 Claims, 4 Drawing Sheets

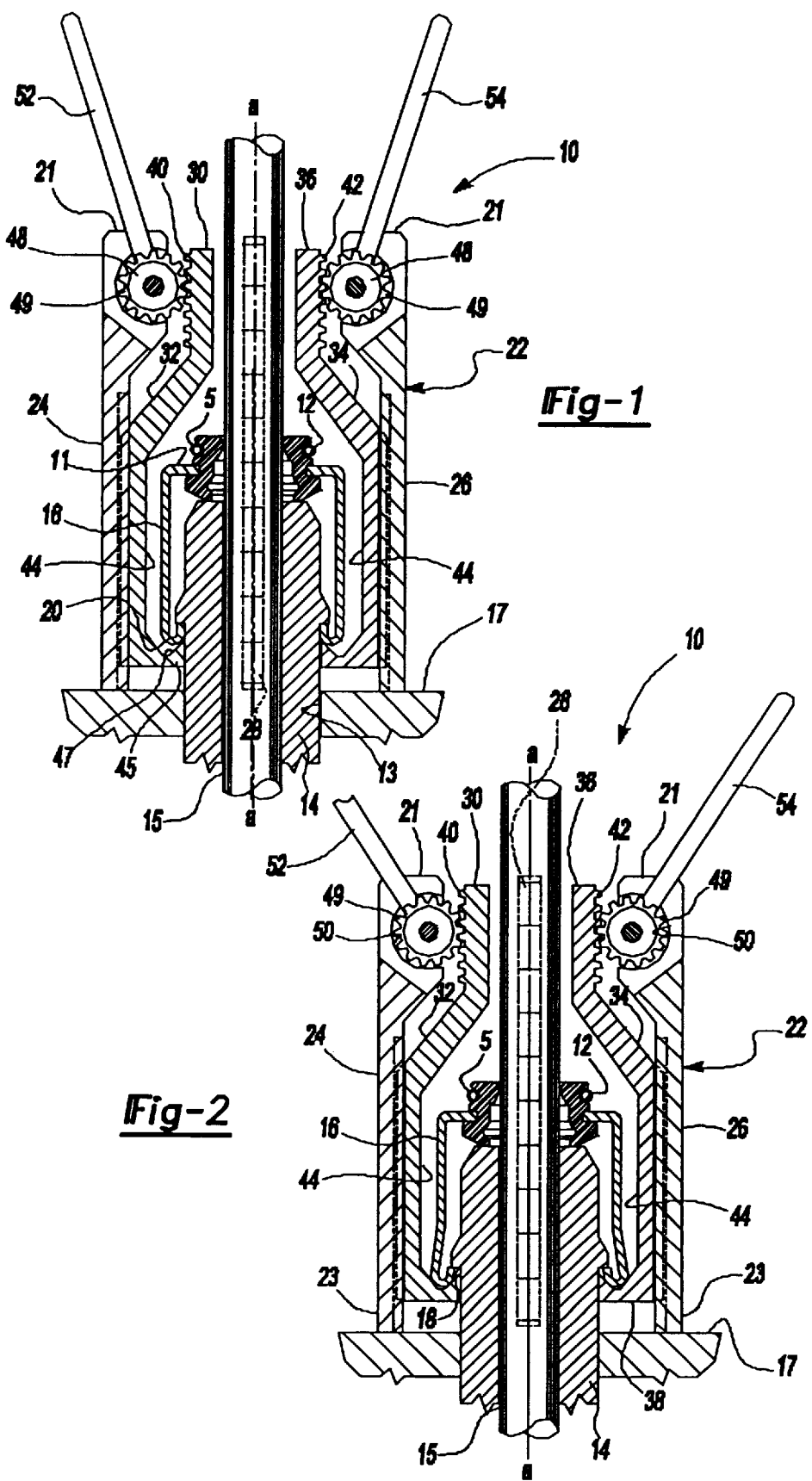

SERVICE TOOL FOR REMOVAL OF VALVE SEAL ASSEMBLY

BACKGROUND OF THE INVENTION

1. Field of Invention

The present invention relates to valve stem seal assemblies for use in internal combustion engines, and more particularly to service tools adapted for removal of such assemblies from valve guides of engines.

2. Description of the Prior Art

Those skilled in the art will appreciate the manner in which intake and exhaust valves are employed in cylinder heads of internal combustion engines. Such valves, supported for reciprocal motion within valve guides, include integral elongated stems extending away from the engine cylinder heads, the ends of the stems typically interacting with rotating overhead cams for cyclic or repeated opening and closure of the valves against the force of valve return springs during the combustion cycle. Obviously, in order to permit unobstructed reciprocal movement of the stem in the guide, some mechanical clearance must exist between the valve guide and the moving stem. A plurality of valve stems thus move reciprocally to and from the cylinder head, each within its individual guide, and so-called valve stem seal assemblies are used to seal against leakage of oil through a mechanical clearance path between each annular engine valve guide and its associated valve stem.

As is well known, the intake port of a combustion chamber is opened and closed by the reciprocating motion of at least one intake valve, which in turn is driven by the rotary motion of a cam, the latter being affixed to and rotatable with an engine camshaft. The intake valve permits fuel mixed with air to flow into the combustion chamber. In addition, an internal combustion engine has at least one exhaust valve and associated exhaust port for releasing expended combustion gases to the atmosphere. Typically, intake and exhaust valves are of similar construction and both include stems integrally affixed to the valves.

In the typical engine, a valve stem seal assembly is fitted over or atop each valve guide, wherein each seal assembly has a typically cylindrical flangeless retainer frictionally mounted to an associated valve guide, or is alternately retained in place by a flanged retainer and having a normally bottom retainer flange that cooperates with a return spring to assure securement of the assembly on the valve guide under conditions of reciprocal movement of the valve stem within the guide. Each valve stem seal assembly normally has two primary parts; 1) an elastomeric oil seal engaging the valve stem to control leakage of oil between valve stem and guide as noted, and 2) a cylindrical retainer mounted atop of the valve guide to hold the oil seal in place. One particular design of the flangeless style of retainer includes a plurality of elongated fingers to frictionally hold the retainer in place on the guide. The seal is supported in the top of the retainer, and retainer fingers depend downwardly from a portion of the retainer below the elastomeric body of the seal. Radially inwardly extending ends of the fingers are circumferentially adapted to be retained by detents located in the valve guide circumference. Removal of such valve stem seal assemblies is rather cumbersome without an effective tool.

The service tool of the present invention overcomes normal difficulties of removal, and thus facilitates replacement of finger retainer-style valve stem seal assemblies during an engine overhaul.

SUMMARY OF THE INVENTION

The present invention provides a service tool for dislodgement and removal of valve stem seal assemblies installed atop valve guides of internal combustion engines. The service tool is particularly suited for flangeless retainers having elongated fingers circumferentially arranged for securement to the valve guide, wherein the guide includes detents for frictionally retaining inwardly turned ends of the fingers. In a preferred form, the service tool includes an exterior cylindrical shell formed in two symmetrical halves divided along the longitudinal axis of the shell. A cylindrical puller element is encased within and axially movable in the shell, the puller element also comprising two mating symmetrical halves divided along the same axis. The puller halves are hinged at their top end, and define gear teeth extending about their exterior upper surfaces, and radially inwardly turned arms at their lower ends. The puller arms comprise cam ends which include upwardly turned surfaces adapted to engage and dislodge circumferentially spaced fingers of the valve seal assemblies when the tool is circumferentially closed (i.e., via hinge) about an installed valve stem seal. Respective mating halves of puller and shell are coupled together in a manner to support axial vertical movement of the puller within the shell, and to permit the respectively mated halves to swing open together about the top hinge of the puller.

A pair of symmetrically opposed worm gears is supported in sockets of the exterior shell halves; one gear and socket are positioned in each half, wherein each worm gear respectively engages gear teeth of one of the puller halves. A pair of levers is disposed for angular up and down movement, wherein each lever is rigidly affixed to one respective worm gear, and extends radially outwardly therefrom. Simultaneous movement of said levers produces an angular follower movement of the worm gears within their respective sockets, causing the gear teeth of the worm gears to move in rotatably axially directed arcs, whereby the puller is caused to move up within the shell to dislodge the retainer fingers from their valve guide detents via the puller cam ends.

BRIEF DESCRIPTION OF THE DRAWINGS

FIG. 1 is a cross-sectional view of one preferred embodiment of the service tool of the present invention, shown placed over and closed about an installed valve stem seal.

FIG. 2 is a cross-sectional view of the same preferred embodiment of the service tool during first stage of finger removal from detents of a valve guide.

DETAILED DESCRIPTION OF PREFERRED EMBODIMENTS

Figure 3:
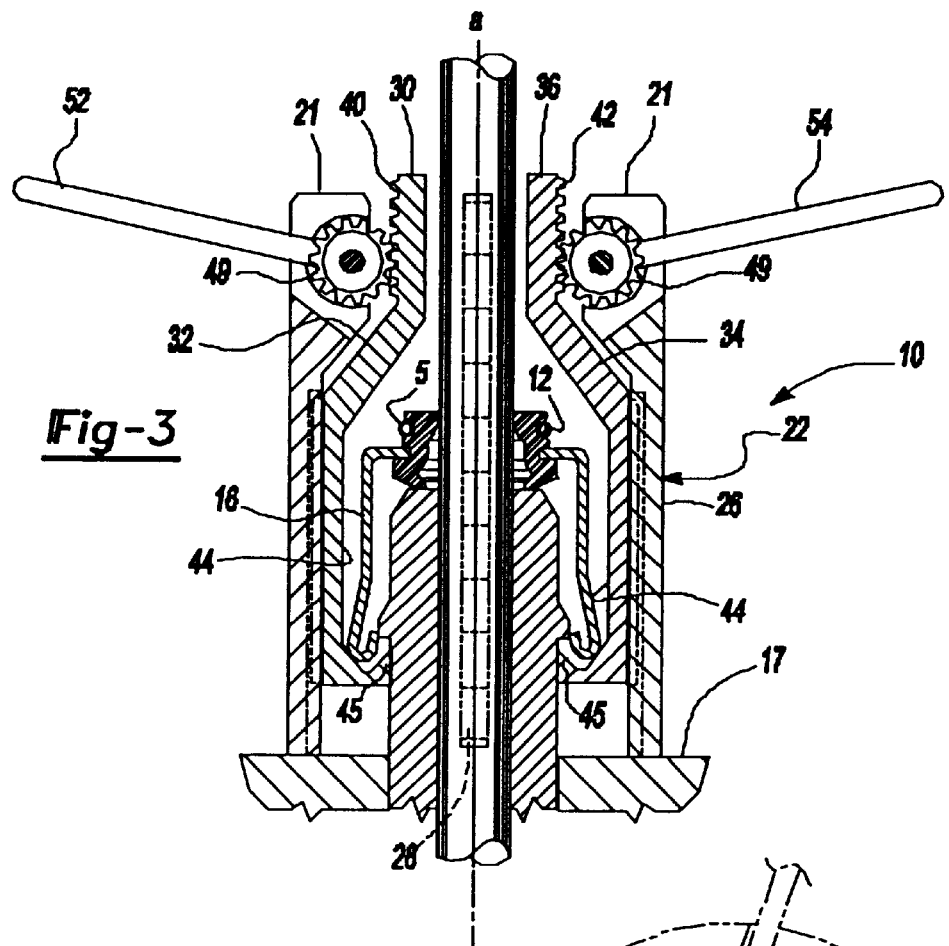
FIG. 3 is a cross-sectional view of the same preferred embodiment of the service tool shown in an advanced stage wherein the valve stem seal is being vertically lifted from the valve guide.

Referring initially to FIGS. 1–3, a preferred embodiment of the service tool 10 is positioned in place to remove a valve stem seal 12, shown installed atop of an annular valve guide 14. The valve stem seal 12 is of the type supported in place by a flangeless cylindrical retainer 16 having longitudinally extending elongate retainer fingers (also shown at 16). The fingers 16 comprise radially inwardly turned ends 20 that cooperate with integral horizontally disposed detents 18 (FIG. 2) of the valve guide 14 for securing the valve stem seal 12 in place. Those skilled in the art will appreciate that the valve stem seal 12 is resilient, typically formed of elastomeric material, to sealingly engage an elongate valve stem 15.

The valve stem 15 is supported for reciprocal movement within the valve guide 14, which fixedly extends longitudinally (or upwardly, as shown) through an aperture 13 of a cylinder head deck 17. The annular body of the seal 12 is adapted to engage the circumferential exterior surface of the valve stem 15 for limiting and or otherwise controlling leakage of crankcase oil along a path between the stem 15 and the valve guide 14 for undesirable admission of oil into the combustion chamber, as will be appreciated by those skilled in the art. The seal 12 is supported within an end wall 11 of the fingered retainer 16, the retainer being formed of metal in the preferred embodiment described and shown herein. To enhance sealing effectiveness, a garter spring 5 encircles the exterior of the seal 12 to impart a radial compression force against the reciprocally moving valve stem 15.

The service tool 10 comprises an exterior shell 22 having a first and second ends 21 and 23, respectively (FIG. 2). The exterior shell consists of two shell halves 24 and 26, which are divided symmetrically along an axis a—a.

A puller element 30 is symmetrically encased within the exterior shell 22, and is axially movable therein. Both exterior shell and puller structures have frustoconical upper body portions in the preferred embodiment, as shown. This design permits the seal dislodgement mechanism to be situated above the body of the seal to be removed, as will be appreciated by those skilled in the art. The puller element 30 includes halves 32 and 34 that are also divided along axis a—a. The puller element 30 has a top end 36 and a bottom end 38 which are substantially coterminous with the first or top end 21 and second or bottom end 23 of the exterior shell 22.

Figure 8:
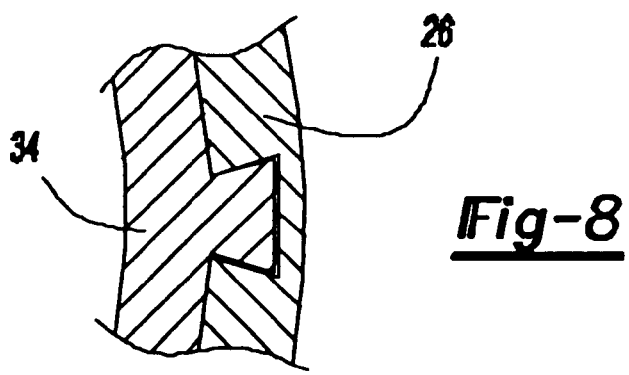
FIG. 8 is a cross-sectional view of a dovetailed connection between the service tool parts indicated.

It will be appreciated by those skilled in the art that the puller element 30 is coupled to, and yet relatively movable along axis a—a with respect to the exterior shell 22. For this purpose each of the puller halves 32 and 34 must be dovetailed or keyed (see FIG. 8) to their respective mated exterior shell halves 24 and 26.

Figure 4:
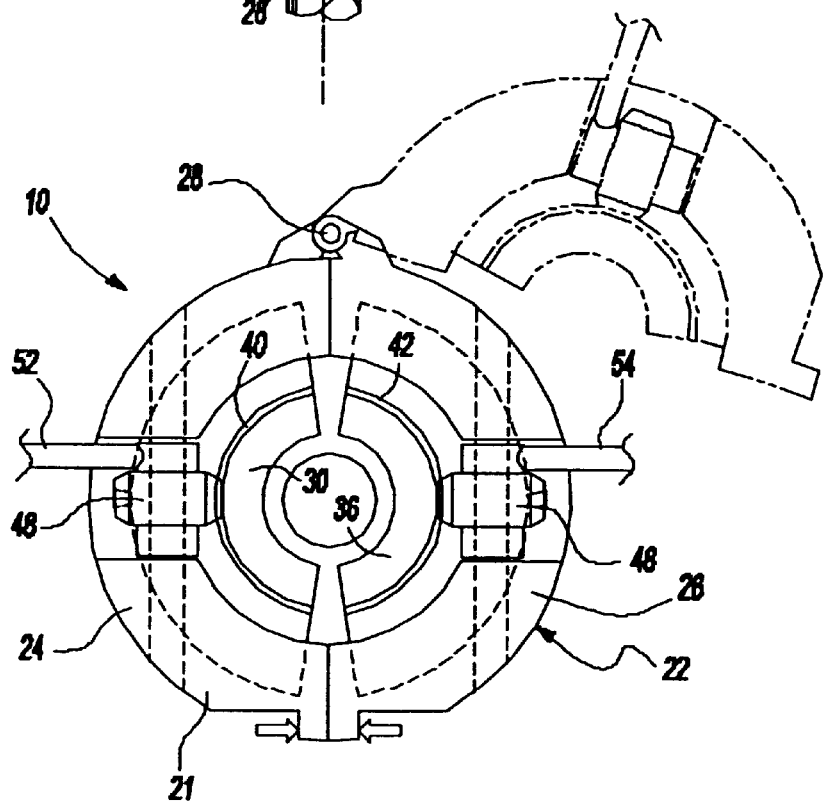
FIG. 4 is a top view of the same preferred embodiment of the service tool, with a superimposed phantom view demonstrating operation of a side-mounted hinge employed to open and close the service tool about a valve stem seal.

Referring to FIG. 4, the halves 24 and 26 are adapted to swing open about a slide-mounted hinge 28 that is parallel to axis a—a. Since they are coupled to the halves 24 and 26, the respective mated puller halves 32 and 34 will also swing open with the exterior shell halves.

Figure 5:
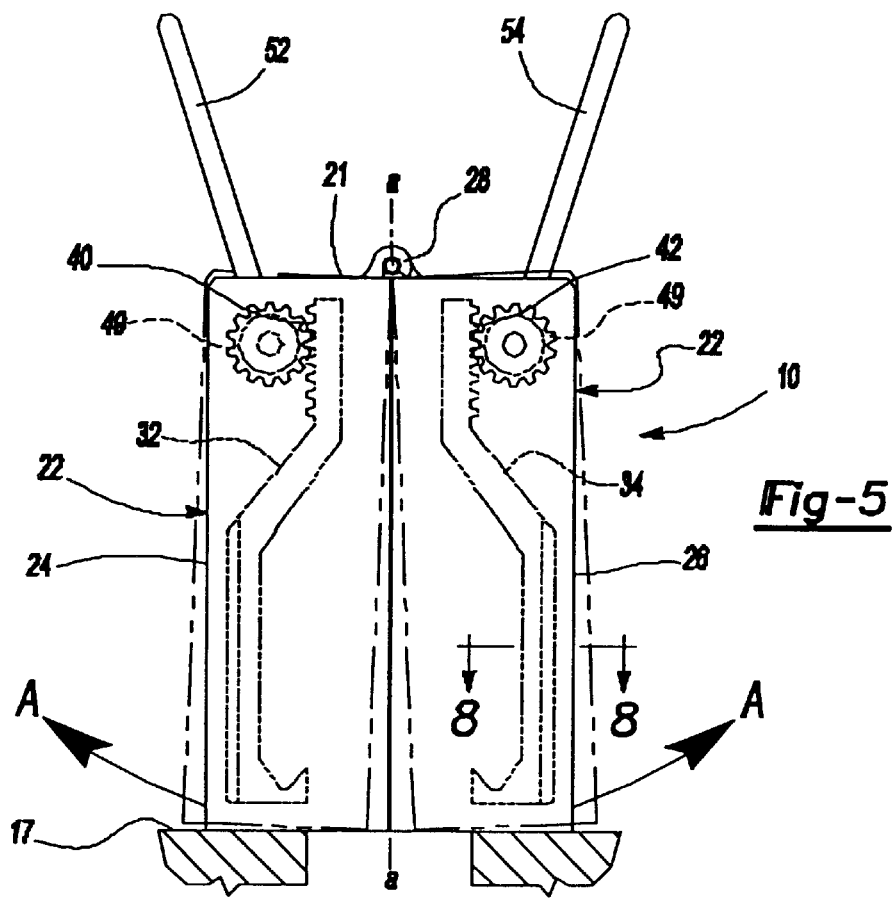
FIG. 5 is an elevation view of and alternate preferred embodiment of the service tool, with a superimposed phantom view for demonstrating operation of a top mounted hinge mechanism.
Figure 6:
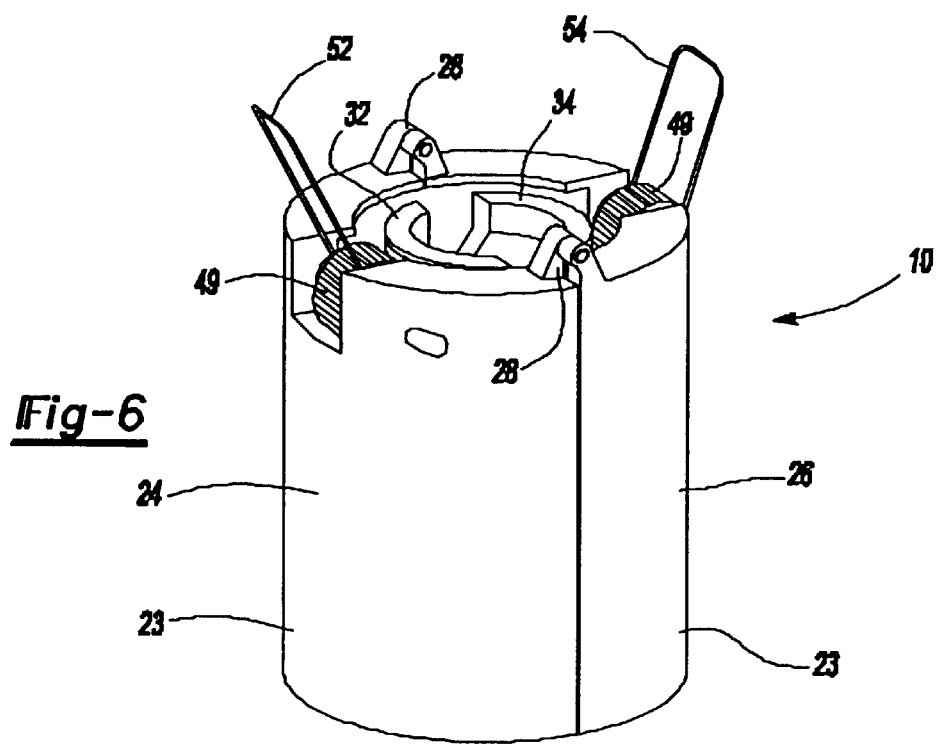
FIGS. 6 and 7 are perspective and top views, respectively, of the alternate preferred embodiment of FIG. 5.
Figure 7:
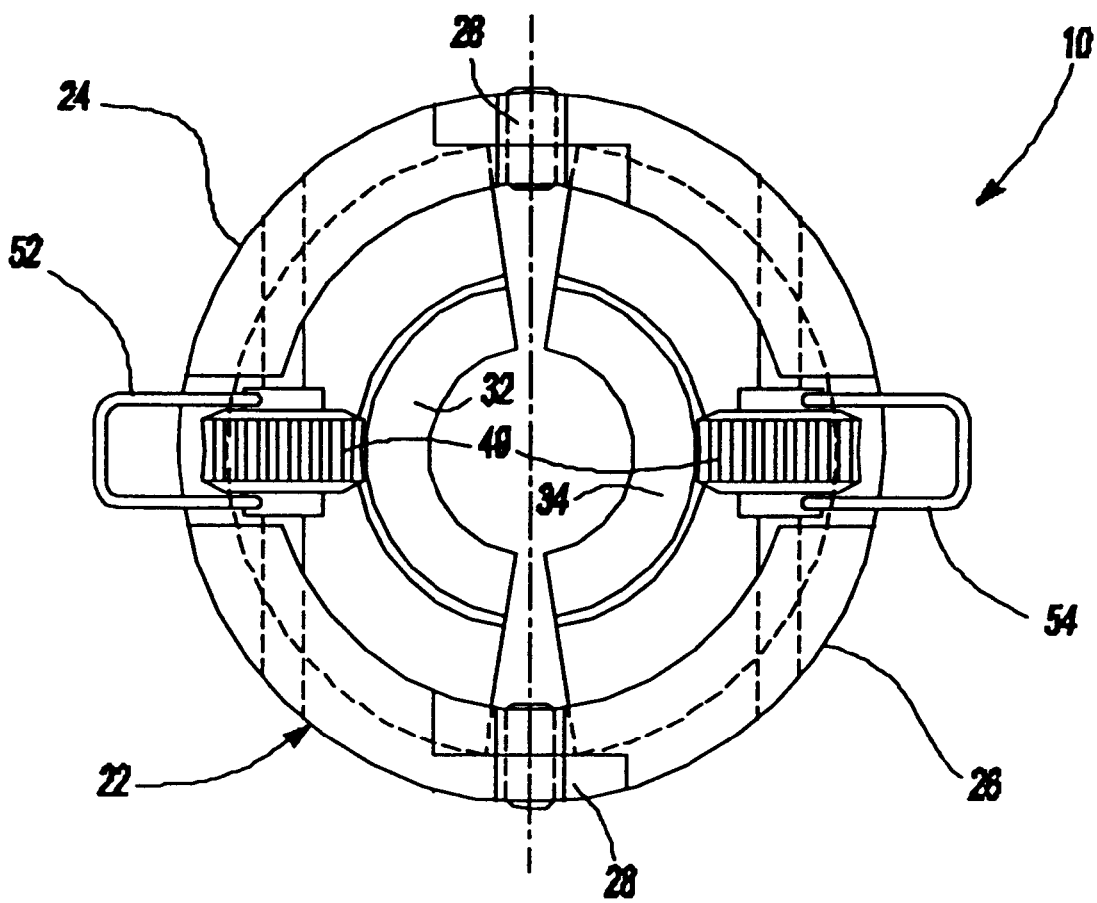

In other applications, depending on particular geometries of the associated engine, the hinged structure may alternatively be top-mounted as shown in the alternative embodiment shown in FIGS. 5, 6, and 7. In the latter embodiment, the puller element halves 32 and 34 are connected at their first or top end 36 by a pair of hinges 28'. Thus, the lower ends 23 of the shell halves 24 and 26 swing apart along an arc A—A about the top-mounted hinges 28'(FIG. 5), in order to accommodate placement over the valve stem seal to be removed. Obviously, the respectively mated puller halves 32 and 34, coupled to the shell halves 24 and 26, will swing open along arc A—A as well.

Referring particularly to FIGS. 3 and 5, a set of gear teeth 40 and 42 are provided in the exterior surfaces of the upper ends of the puller halves 32 and 34, respectively. The circumferential body collectively presented by the puller element halves 32 and 34 has a cross-section defining arms 44 at the bottom of the puller element 30. The arms 44 incorporate cam ends 45 which contain upwardly turned cam surfaces 47 (FIG. 1) for engaging the inwardly turned ends 20 of the retainer fingers 16 in a manner to be described.

The teeth 49 of each of the pair of worm gears 48 (FIG. 1) are disposed in spherical reaction sockets 50 (FIG. 2) situated in each exterior shell half 24 and 26. Each worm gear 48 engages respective gear teeth 40 and 42 (FIGS. 3 and 5) of the puller element halves 32 and 34. A pair of levers 52 and 54 is rigidly affixed to respective worm gears 48, each lever to one gear. The levers are spaced circumferentially 180 degrees apart about the upper circumference of the tool. Thus it will be appreciated that simultaneous downward movement of the levers will give rise to an angular movement of the worm gears within their respective sockets, causing the teeth of the worm gears to rotate in axially directed arcs. This action will cause an upward movement of the puller element 30, wherein the ends 20 of the fingers 16 may be effectively dislodged from the detents 18 by the interaction of the cam ends 45 with the ends 20.

The sequence of dislodgement and removal of a valve stem seal 12 may now be described with particular reference to FIGS. 1–3 as follows. In FIG. 1, as earlier noted, the service tool 10 is shown placed over a valve stem seal 12 for removal of the seal, the shell halves 24 and 26 being closed together for this purpose. In FIG. 2, it will be apparent that the upwardly turned cam surfaces 47 of the cam ends 45 have effectively dislodged the radially inwardly turned ends 20 of the retainer fingers 16, as shown. Thus, as the levers 52 and 54 are displaced downwardly, the cam ends 45 will cause the retainer ends 20 to be flared radially outwardly for dislodgement of the retainer ends 20 from the detents 18. In FIG. 3, it will be apparent that the levers 52 and 54 have been yet further downwardly displaced to cause actual elevation of the puller element halves 30 in 32, in turn physically lifting the seal 12 from the valve guide.

Although the described embodiment of this invention contemplate that the exterior shell 22, worm gears 48, and the puller element 30 are each formed of metal, other materials may be suitable, depending upon strength of materials and desired useful lives of the service tool 10. For example, some glass-filled nylons or other plastics may be suitable in some applications. Obviously, in such cases, to the extent that the worm gears interface with both shell and puller elements, all parts should preferably be formed of either plastic materials or of metal materials, one or the other, and not in a combination of materials.

Finally, it will be noted that the second, lower, end 23 of the exterior shell 22 acts as a base of the tool 10, supported on the cylinder head deck 17, during removal operation. Thus, the lever reaction load during seal dislodgement and removal is transferred into the base and the deck 17.

The above description is intended to be illustrative, and not limiting. Many embodiments will be apparent to those of skill in the art upon reading the above description. The scope of the invention should be determined, however, not with reference to the above description, but with reference to the appended claims and the full scope of equivalents to which the claims are entitled by law.

What is claimed is:

1. A service tool adapted for dislodgement and removal of a valve stem seal assembly installed on a valve guide of an internal combustion engine, said seal assembly having a retainer with fingers extending along a longitudinal axis of the guide, the guide having detents for frictionally retaining radially inwardly turned ends of said fingers; said service tool comprising:

a) an exterior shell having first and second ends, said shell comprising substantially symmetrical halves divided along a longitudinal axis, b) a puller element axially movable in said shell, said puller element also comprising substantially symmetrical halves divided along said axis, said halves of said puller element being hinged, wherein each of said puller element halves further define gear teeth extending about exterior surfaces of said first ends thereof and radially inwardly turned arms at said second ends, wherein said arms comprise cam ends adapted to engage and dislodge circumferentially spaced fingers of said retainer;

c) a pair of opposed worm gears, each supported in a socket of one of said exterior shell halves at said first end thereof, wherein each of said worm gears respectively engages one of said gear teeth of said puller halves; and d) a pair of levers disposed for angular movement, each lever being rigidly affixed to one respective worm gear and extending radially outwardly therefrom, whereby simultaneous movement of said levers effects angular movement of said worm gears within said respective sockets, in turn causing the gear teeth of the worm gears to rotate in axially directed arcs, and the puller element to thereby move up and down, whereby said fingers are effectively dislodged from said detents via said cam ends.

2. The service tool of claim 1 wherein said puller element comprises first and second ends substantially coterminous with the first and second ends of said shell, and said wherein gear teeth are symmetrically disposed about said exterior surfaces said first ends of said respective halves of said puller element.

3. The service tool of claim 2 wherein said worn gears each comprise a substantially spherical body, wherein each of said bodies are circumferentially spaced in a diametrically opposed manner, each gear positioned within said socket of each half of said exterior shell.

4. The service tool of claim 3 wherein said first end of said puller element comprises a vertically upper end thereof, and said second end of said puller element comprises a vertically lower end thereof.

5. The service tool of claim 4 wherein said worm gears supported in spherical reaction sockets are positioned to engage said upper end of said puller element.

6. The service tool of claim 5 wherein said exterior shell and said puller element define mating frustoconical cross-sections at their upper ends, and wherein said respective puller and shell halves are coupled together in a manner to permit said puller halves to be axially movable along said axis within said shell halves.

7. The service tool of claim 6 wherein each of said levers comprises a manually operated handle adapted to be moved downwardly for said dislodgement and removal of said valve stem from said valve guide.

8. The service tool of claim 7 wherein said cam ends have upwardly turned cam surfaces for engaging and dislodging said ends of said fingers from said detents.

9. The service tool of claim 8 wherein the second end of said exterior shell comprises a base adapted for support on a cylinder head deck, wherein a reaction load of said dislodgement is transmitted through said base to said deck.

10. The service tool of claim 9 wherein said puller element and said exterior shell halves remain closed about said hinge during said dislodgement.

* * * * *

UNITED STATES PATENT AND TRADEMARK OFFICE
CERTIFICATE OF CORRECTION

PATENT NO.     : 6,415,487 B1
DATED          : July 9, 2002
INVENTOR(S)    : Mark Alan Leimer It is certified that error appears in the above-identified patent and that said Letters Patent is hereby corrected as shown below:

Column 6,
Line 5, replace "wherein said worn gears" with -- wherein said worm gears --.

Signed and Sealed this

Fourth Day of February, 2003

JAMES E. ROGAN
*Director of the United States Patent and Trademark Office*